(12) United States Patent
Zhang et al.

(10) Patent No.: US 9,542,624 B2
(45) Date of Patent: Jan. 10, 2017

(54) RECOGNIZING METHOD OF FLAKY OR BLOCKY PROHIBITED ARTICLES, EXPLOSIVES OR DRUGS

(71) Applicants: Tsinghua University, Beijing (CN); Nuctech Company Limited, Beijing (CN)

(72) Inventors: Li Zhang, Beijing (CN); Qingping Huang, Beijing (CN); Yunda Sun, Beijing (CN); Lei Lei, Beijing (CN); Zhi Tang, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 0 days.

(21) Appl. No.: 15/074,270

(22) Filed: Mar. 18, 2016

(65) Prior Publication Data
US 2016/0314378 A1    Oct. 27, 2016

Related U.S. Application Data

(62) Division of application No. 14/162,225, filed on Jan. 23, 2014, now Pat. No. 9,449,399.

(30) Foreign Application Priority Data

Feb. 1, 2013    (CN) .......................... 2013 1 0041293

(51) Int. Cl.
*G06K 9/62* (2006.01)
*G01V 5/00* (2006.01)
(Continued)

(52) U.S. Cl.
CPC ............ *G06K 9/6267* (2013.01); *G01V 5/005* (2013.01); *G06K 9/52* (2013.01); *G06T 5/00* (2013.01);
(Continued)

(58) Field of Classification Search
CPC ........ G06K 9/34; G06K 9/342; G06K 9/4368; G06K 2209/09; G06T 7/0079; G06T 7/0081; G06T 7/0097; G06T 7/60; G06T 2207/20141; G01V 5/0008; G01V 5/0016; G01V 5/005
See application file for complete search history.

(56) References Cited

U.S. PATENT DOCUMENTS

| 5,905,806 | A | 5/1999 | Eberhard et al. |
| 6,078,642 | A | 6/2000 | Simanovsky et al. |

(Continued)

FOREIGN PATENT DOCUMENTS

| CN | 1178019 A | 4/1998 |
| CN | 1305610 A | 7/2001 |

OTHER PUBLICATIONS

"U.S. Appl. No. 14/162,225, Ex Parte Quayle Action mailed Mar. 21, 2016", 5 pgs.
(Continued)

*Primary Examiner* — Andrew W Johns
(74) *Attorney, Agent, or Firm* — Schwegman Lundberg & Woessner, P.A.

(57) ABSTRACT

The present invention discloses recognizing methods of flaky or blocky prohibited articles, explosives or drugs. Specifically, the method for recognizing flaky prohibited articles, explosives or drugs comprises steps of: (1) reading in tomogram data of an object to be inspected for one tomogram; (2) pre-processing the tomogram data; (3) splitting the pre-processed tomogram data into a plurality of regions that have similar physical properties; (4) analyzing whether each of the split regions is a flaky region; (5) determining whether the flaky region recognized in the current tomogram can be merged with the flaky region detected from the previous tomogram, so as to form a flaky target; (6) determining whether each detected flaky target is
(Continued)

complete or finished; (7) repeating steps (1)-(6) and processing each tomogram data layer by layer, until all of the tomogram data have been processed.

9 Claims, 6 Drawing Sheets

(51) Int. Cl.
  *G06T 7/40* (2006.01)
  *G06K 9/52* (2006.01)
  *G06T 5/00* (2006.01)
  *G06T 7/60* (2006.01)
  *G06K 9/46* (2006.01)

(52) U.S. Cl.
  CPC . *G06T 7/40* (2013.01); *G06T 7/60* (2013.01); *G06K 2009/4666* (2013.01); *G06T 2207/10088* (2013.01); *G06T 2207/20021* (2013.01); *G06T 2207/20172* (2013.01); *G06T 2207/30242* (2013.01)

(56) References Cited

U.S. PATENT DOCUMENTS

| | | |
|---|---|---|
| 6,195,444 B1 | 2/2001 | Simanovsky et al. |
| 2013/0170723 A1* | 7/2013 | Kwon et al. .......... G06T 7/0079 382/131 |
| 2014/0219501 A1 | 8/2014 | Zhang et al. |

OTHER PUBLICATIONS

"U.S. Appl. No. 14/162,225, Ex Parte Quayle Action mailed Dec. 30, 2015", 5 pgs.
"U.S. Appl. No. 14/162,225, Notice of Allowance mailed Jun. 2, 2016", 5 pgs.
"U.S. Appl. No. 14/162,225, Response filed Feb. 29, 2016 to Ex Parte Quayle Action mailed Dec. 30, 2015", 7 pgs.
"U.S. Appl. No. 14/162,225, Response filed May 9, 2016 to Ex Parte Quayle Action mailed Mar. 21, 2015", 7 pages.
"U.S. Appl. No. 14/162,225, Response filed Dec. 8, 2015", 10 pgs.
"U.S. Appl. No. 14/162,225, Restriction Requirement mailed Oct. 9, 2015", 6 pgs.

* cited by examiner

RECOGNIZING METHOD OF FLAKY OR BLOCKY PROHIBITED ARTICLES, EXPLOSIVES OR DRUGS

CROSS-REFERENCE TO RELATED APPLICATION

This application is a Divisional of U.S. application Ser. No. 14/162,225, filed on 23 Jan. 2014, which claims the benefit of priority to Chinese Patent Application Serial No. 201310041293.3 filed 1 Feb. 2013; which applications and publications are incorporated herein by reference in their entireties.

BACKGROUND OF THE INVENTION

1. Field of the Invention

The present invention generally relates to recognition methods of prohibited articles, explosives or drugs in computed tomogram imaging data, and more particularly, to recognition methods of flaky or blocky prohibited articles, explosives or drugs.

2. Description of the Related Art

Since 9-11 event of the United States, security inspection in aviation industry has become more and more concerned. CT technique based security inspection products have incomparable advancement, and significant property superiority. TSA mechanism of US contends that one important way for achieving safety inspection in airports is to employ CT apparatuses and inspection methods thereof. The recognition to the flaky or blocky prohibited articles is one key technique for the CT apparatus, which play a pivotal role to inspect the prohibited articles hidden in the luggage and parcel. Particularly, the recognition method of the flaky prohibited articles would prevent the prohibited articles being entrained in books or notebooks.

Through analysis of several references U.S. Pat. No. 6,195,444 B1, CN 1305610A and CN 1178019A in the prior art, it can be apparent that they all employ methods of directly analyzing three-dimensional volume data, and thus the three-dimensional data will not be analyzed till the last tomogram data is obtained. Therefore, this results in a period of waiting time. In this way, this causes the following disadvantages: too much waiting and analyzing time, and relatively long time delay, due to too many tomogram data to be analyzed, huge amount of data is, and long time for analyzing after the last tomogram data are acquired. In the above patent references, a cube background method or morphological erosion method is used to inspect the flaky objects. This indirectly utilizes physical features that the flaky objects have a relatively thin thickness, and it is not convenient to set parameters thereof. The cube background method has high complexity and large computing amount. And further, when the flaky object is close to one blocky object, or has many pixels adjacent thereto, this method tends to become invalid and neglect some objects upon recognizing, since the pixels to be detected have little differences from the background pixels.

In view of this, there indeed needs to provide recognition methods of flaky or blocky prohibited articles, explosives or drugs, which can reduce or eliminate the time delay.

SUMMARY OF THE INVENTION

In view of the above shortages in prior arts, an object of the present invention is to alleviate at least one aspect of the above problems and defects.

In accordance with one aspect of the present invention, it provides a method for recognizing flaky prohibited articles, explosives or drugs, characterized in that, comprising steps of:

(1) reading in one tomogram data of an object to be inspected;
(2) pre-processing the tomogram data;
(3) splitting the pre-processed tomogram data into a plurality of regions that have similar physical properties;
(4) analyzing whether each of the split regions is a flaky region;
(5) determining whether the flaky region recognized in the current tomogram can be merged with that of its previous tomogram, so as to form a flaky target;
(6) determining whether each detected flaky target is complete or finished;
(7) repeating steps (1)-(6) and processing each tomogram data layer by layer, until all of the tomogram data have been processed.

In accordance with another aspect of the present invention, it also provides a method for recognizing blocky prohibited articles, explosives or drugs, characterized in that, comprising steps of:

(1) reading in data of one tomogram of an object to be inspected;
(2) pre-processing the current tomogram data;
(3) splitting the pre-processed tomogram data into a plurality of regions that have similar physical properties;
(4) as for each split region, physical property thereof is searched within a database of prohibited articles, explosives or drugs, and if a prohibitive physical property is found, then the split region is recognized as an effective blocky region;
(5) determining whether the blocky region recognized in the current tomogram can be merged with that of its previous tomogram, so as to form a blocky target;
(6) determining whether each detected blocky target is finished or complete;
(7) repeating steps (1)-(6) and processing each tomogram data one tomogram by one tomogram, until all of the tomogram data have been processed.

Concerning the above, in the present invention, the complex problem of extracting three-dimensional targets is simplified as the problem of extracting two-dimensional targets, the technique of which is more mature. The present method does not need to obtain all the imaging data of tomogram at one time. In addition, the present method employs advanced tomogram analysis layer by layer, and then gradually adds up the tomogram areas, so as to grow up to become the three-dimensional object. Since the tomogram data is analyzed layer by layer, no waiting time is needed. Once the data of one tomogram is received, these will be analysed and recognized immediately, and the same processing procedure is applied to the next tomogram. In this way, when the last tomogram is received, only the data of this tomogram are needed to be analyzed. The data to be added up are small, that is, the data amount to be analyzed is small, and thus there is little time delay. When inspecting the flaky target, it is capable of more quickly locating it by directly measuring the geometric property of the two-dimensional areas, such as length, thickness. Therefore, the present invention is obviously different from the prior art.

BRIEF DESCRIPTION OF THE DRAWINGS

These and other aspects as well as advantages of the present invention will become apparent and readily understood from the description of the preferred embodiments taking in conjunction with the accompanying drawings, in which.

DETAILED DESCRIPTION OF THE EMBODIMENTS

Figure 1:
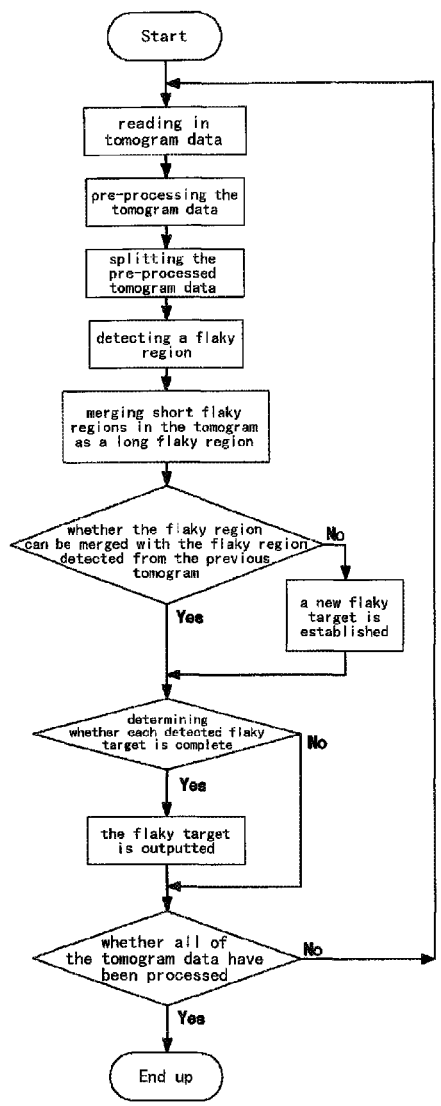
FIG. 1 is a flowchart of a recognition method of flaky prohibited articles in accordance with a first embodiment of the present invention.

Technical solutions of the present invention will be described hereinafter in more detail by the way of embodiment with reference to figures of the attached drawings, wherein the same or like reference numerals refer to the same or like elements throughout the specification. The explanation to the embodiment of the present invention with referring to the accompanying drawings is intended to interpret the general inventive concept of the present invention, rather than being construed as a limiting to the present invention.

A main concept of the present invention is as follows: analyzing imaging data of computed tomogram layer by layer; obtaining a two-dimensional target area by using database of prohibited articles, explosives and/or drugs, including steps of pre-processing, splitting the image, and detecting and merging of effective regions; and merging these two-dimensional target areas into a three-dimensional target object, so that an incremental detection for the prohibited articles is achieved within the imaging data of computed tomogram, without any delays. The above concept of the present invention is applicable to intelligent recognition of flaky or blocky prohibited articles (for example, explosives, drugs, and cutting tools). When recognizing the flaky prohibited articles, explosives, and drugs, it is possible to locate it more quickly and accurately, by directly measuring geometrical property of the two-dimensional regions, such as length, or thickness. When recognizing the blocky prohibited articles, explosives and drugs, the effective blocky regions are accurately recognized by searching in the database of prohibited articles, explosives and drugs.

First Embodiment

Figure 2:
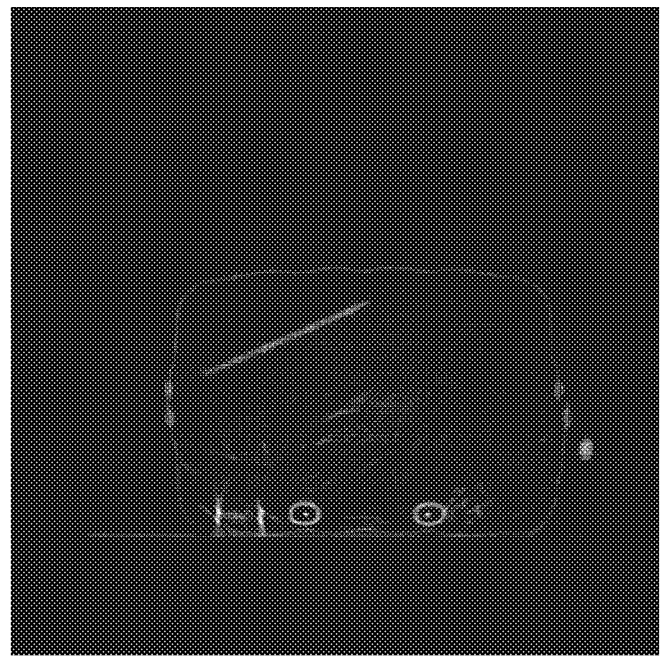
FIG. 2 is a schematic image of the recognition method after quantizing processing of tomogram data as shown in FIG. 1.

In the first embodiment of the present invention, an item suspected to house a flaky prohibited article, is a luggage box. With referring to FIG. 1, if it is intended to make inspection and recognition of the luggage box so as to determine whether it contains the flaky prohibited articles, then the recognizing steps thereof are exemplified as follows:

1) tomogram data of the objects to be inspected for one tomogram are read in;

2) The tomogram data is pre-processed. The pre-processing method in particular comprises: threshold limit, smoothing and quantifying of the tomogram data. As shown in FIG. 2, after quantifying process, the recognized image shows out a long strip-shaped region at a left corner of a rectangular profile, and two rings at the bottom thereof. It can be apparent that the rectangular profile is a sectional profile of the luggage box, and the two rings are sectional profiles of two pulling bars of the luggage box. The long strip-shaped area is suspected to be one flaky prohibited article, which will be further recognized and determined in the subsequent steps.

Figure 3:
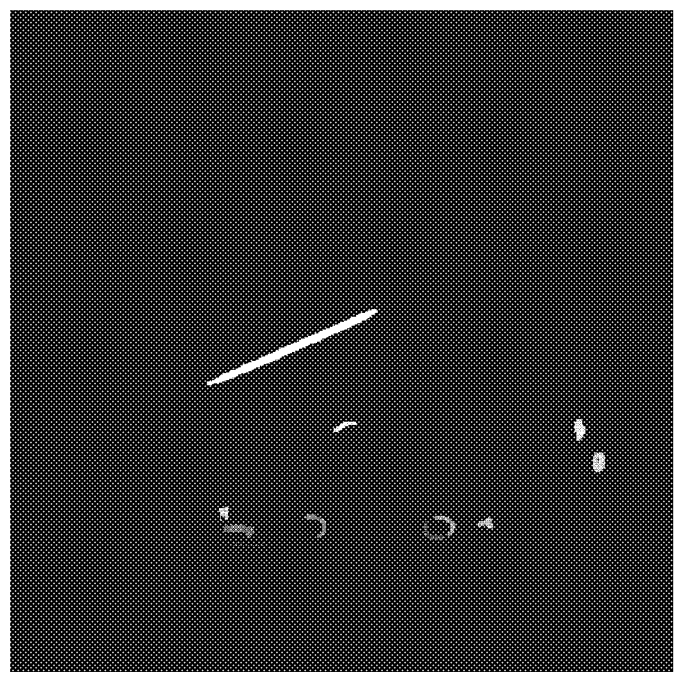
FIG. 3 is a schematic image of the recognition method after splitting tomogram data as shown in FIG. 1.

3) The pre-processed tomogram data are split into a plurality of regions having similar physical properties (for example, density). As shown in FIG. 3, in the image of tomogram data after splitting process, several regions are highlighted from the black background. It is extremely clear for the long strip-shaped region as shown in FIG. 2.

4) Analyzing whether each of the split regions is a flaky region, is performed by principal rules as follows:

Firstly, a length of the split region cannot be less than a predetermined first threshold. Specifically, the length of the present embodiment is approximately a half of a number of profile pixels of the split region. Taking as one example, the first threshold is set to be 80 pixels. A certain split region has a number of profile pixels being 178, and then the length thereof is calculated as 89 pixels.

Secondly, a thickness of the split region cannot be larger than a predetermined second threshold. To be specific, the thickness is obtained by a pixel number in an area of the split region divided by the length thereof. For example, the second threshold is set to be 9 pixels. One certain split region has a pixel number in an area thereof to be 632, and the length is of 89 pixels, then the thickness thereof is calculated as 7.1 pixels.

Thirdly, uniformity of the thickness of the split region cannot be larger than a predetermined third threshold. Specifically, the uniformity of the thickness is measured by "standard deviation of the thickness of the split region divided by average of thickness thereof". For example, the third threshold is set to be 0.5. One split strip-shaped region has a standard deviation of the thickness to be 2.4, and the average of thickness is of 7.1 pixels.

When the above three conditions are satisfied at the same time, the split region is recognized as the sheet-shaped region.

It should be noted that the skilled person in the art can determine values of the first, second, and third thresholds as required, rather than limited to the above exemplified values. Of course, the skilled person in the art can use other known technical means in the art to determine whether the split region is a flaky region. Thus, it is apparent that such technical means should be interpreted to fall within the scope of the present invention.

Figure 4:
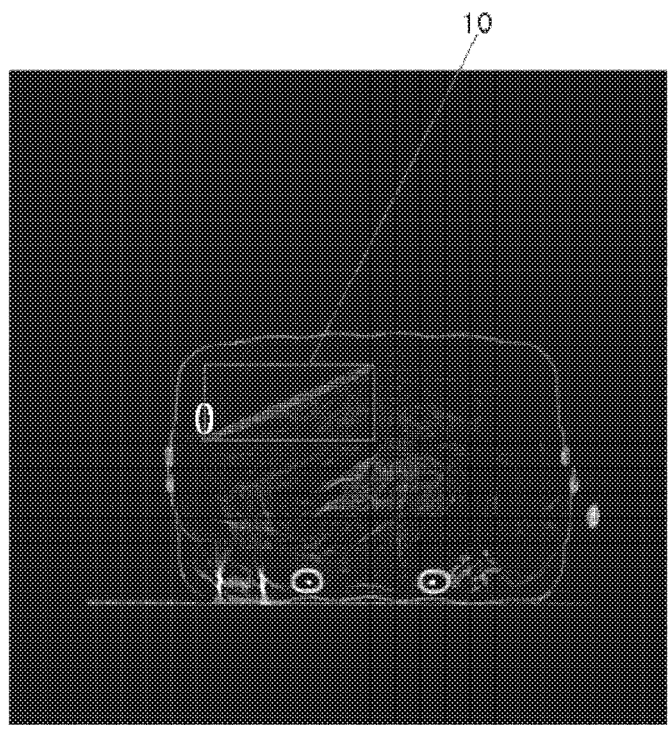
FIG. 4 is a schematic image of the recognition method shown in FIG. 1 where it has recognised out flaky regions within the tomogram.

5) The flaky regions detected out in the current tomogram is post-processed, so as to merge short and split flaky regions as a long flaky region (i.e., merging process). Such merging step is performed based on positional proximity and similarity of physical properties (for example, density and atomic number). It can be seen from FIG. 4 that the recognized region is donated by a reference number 10. It can be known from the above description that the step 5) is optional. The step 5) can be neglected when only one flaky region is present in the tomogram or it is thought that the merging process is not necessary.

6) It is performed to determine whether the flaky region recognized in the current tomogram can be merged with the flaky region detected from the previous tomogram, so as to form a flaky target. It should be noted that if the current tomogram is a first tomogram of the object to be inspected, then it is not necessary for such merging step, and the flaky region is directly considered as a flaky target. After the first tomogram of the object to be inspected is processed, it should be determined whether the flaky regions inspected in the current tomogram can be merged with the previous flaky target (i.e., the flaky target analyzed out in the latest tomogram before the current tomogram, for example, the flaky target recognized out in the first tomogram). This can be determined on basis of the positional proximity, similarity of the physical property (for example, density and atomic number). If not, then a new flaky target is established.

Figure 5:
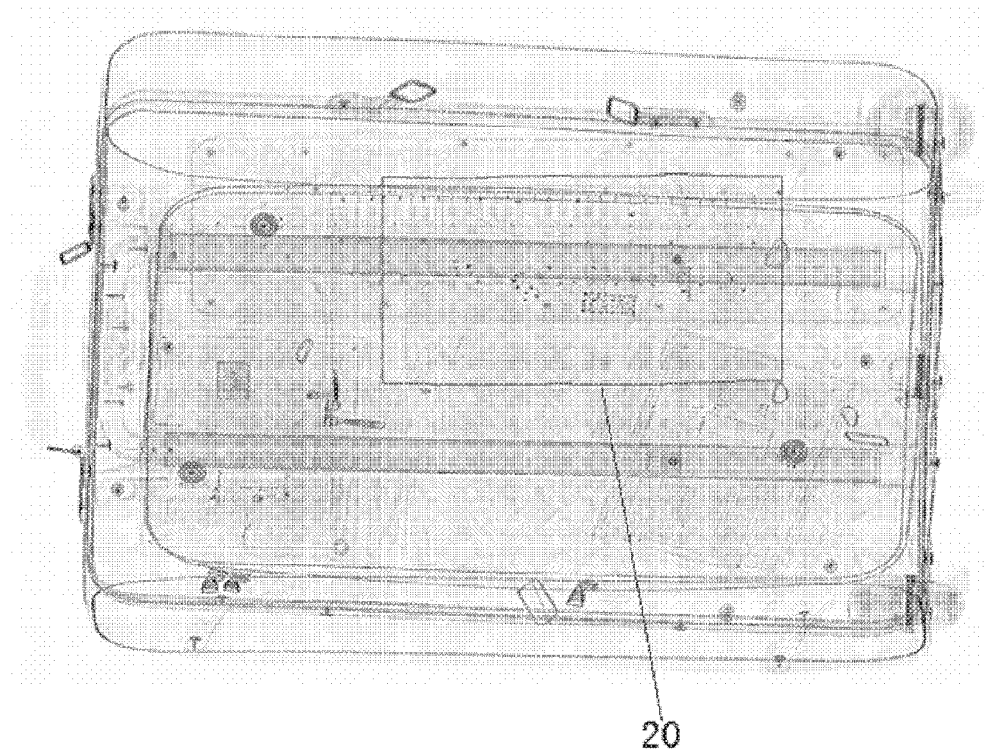
FIG. 5 is a schematic image of outputted flaky targets in accordance with the recognition method of FIG. 1.

7) The step of determining whether each detected flaky target is complete or finished, is performed. If the detected flaky target is finished, then the flaky target having a mass within a predetermined or reasonable range (i.e., a mass range of a prohibited article) is outputted. As shown in FIG. 5, the outputted flaky target is donated by a reference number 20.

8) The steps (1)-(7) are repeated and each tomogram data are processed layer by layer, until all of the tomogram data have been processed.

Here, it can be seen that the flaky target 20 can be recognized out by the recognizing method in accordance with the first embodiment of the present invention.

It should be understood that the recognizing method of the present embodiment can apply to recognize the cutting tools, because they have the features of flaky shapes. When the thickness of the cutting tool conforms to the feature of the flaky shape in the above method, and the physical property (in the present embodiment for example, the values of the density and atomic numbers, or the like) of the image in this method is set to be characteristics of raw material (for example, materials such as iron, copper and so on) of the cutting tool, such method can be used to automatically recognize and inspect the cutting tools.

Of course, the above recognizing method of the flaky prohibited articles can be applied to flaky explosives or drugs. If required, appropriate adjustments of parameters and/or technical means can be performed based on the inspected targets (for example, prohibited articles, explosives, or drugs).

Second Embodiment

Figure 6:
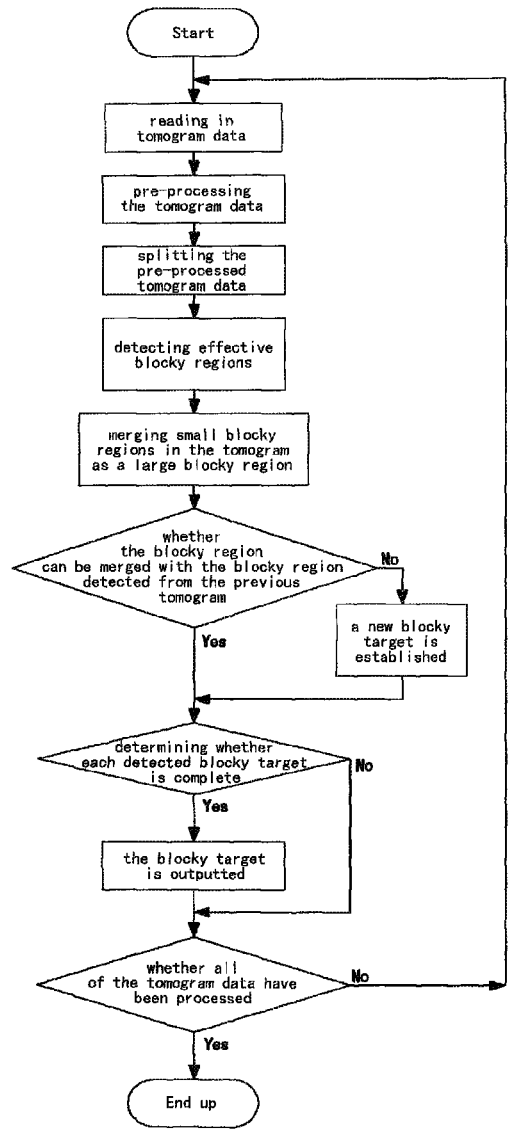
FIG. 6 is a flowchart of a recognition method of blocky prohibited articles in accordance with a second embodiment of the present invention.
Figure 7:
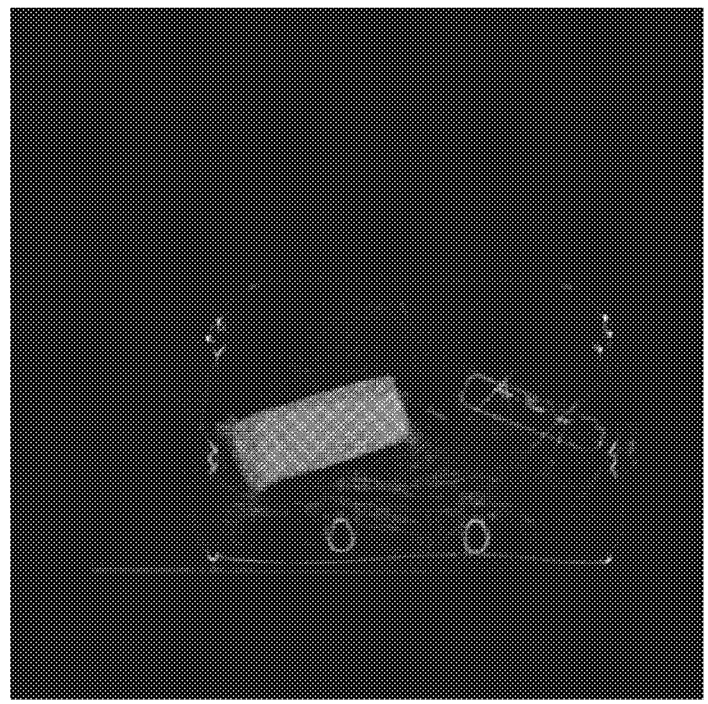
FIG. 7 is a schematic image of the recognition method after quantizing processing of tomogram data as shown in FIG. 6.

In the second embodiment of the present invention, an item suspected to house a blocky prohibited article, is a luggage box. With referring to FIG. 6, if it is intended to make inspection and recognition of the luggage box so as to determine whether it contains the blocky prohibited articles, then the recognizing steps thereof are exampled as follows:

1) tomogram data of the objects to be inspected (for example, the luggage box) for one tomogram are read in;

2) Current tomogram data are pre-processed. The pre-processing method comprises: threshold limit, smoothing and quantifying of the tomogram data, or the like. As shown in FIG. 7, after quantifying process, the recognized image shows out a rectangular blocky region (which is gray white) at the left side of a rectangular profile, and two rings at the bottom thereof. It can be apparent that the rectangular profile is of a sectional profile of the luggage box, and the two rings are of sectional profiles of two pulling bars of the luggage box. The gray-white and rectangular blocky area is suspected to be one blocky prohibited article, which will be further recognized and determined in the subsequent steps.

Figure 8:
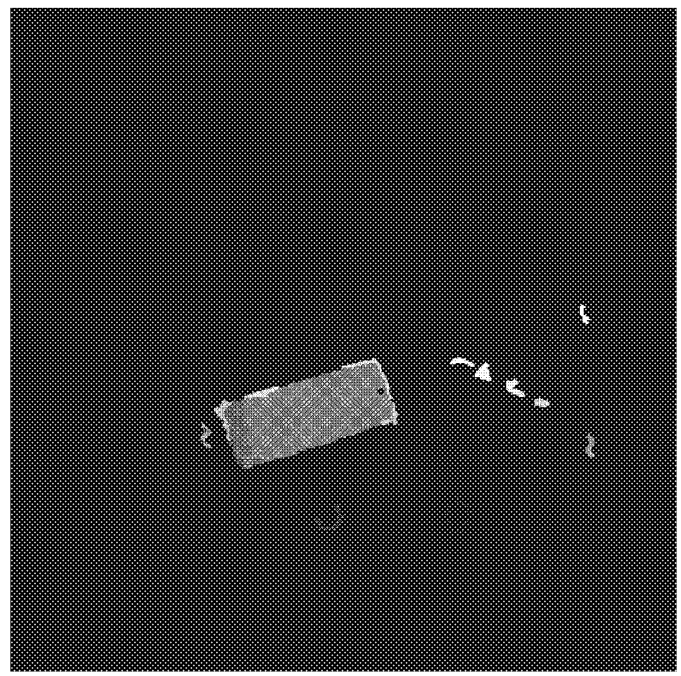
FIG. 8 is a schematic image of the recognition method after splitting tomogram data as shown in FIG. 6.

3) The pre-processed tomogram data are split into a plurality of regions having similar physical properties (for example, density). As shown in FIG. 8, in the image of tomogram data after splitting process, several regions are highlighted from the black background. It is extremely clear for the grey-white and rectangular blocky region as shown in FIG. 7.

4) As for each split region, physical property (for example, an average of density and/or atomic number) thereof is searched within a database of prohibited articles, wherein if the physical property searched is prohibitive, then it is deemed that the split region is recognized as an effective blocky region. The expression "the physical property searched being prohibitive" is meant that the physical property of the split region matches to data within the database of the prohibited articles (for example, explosives, or drugs).

Figure 9:
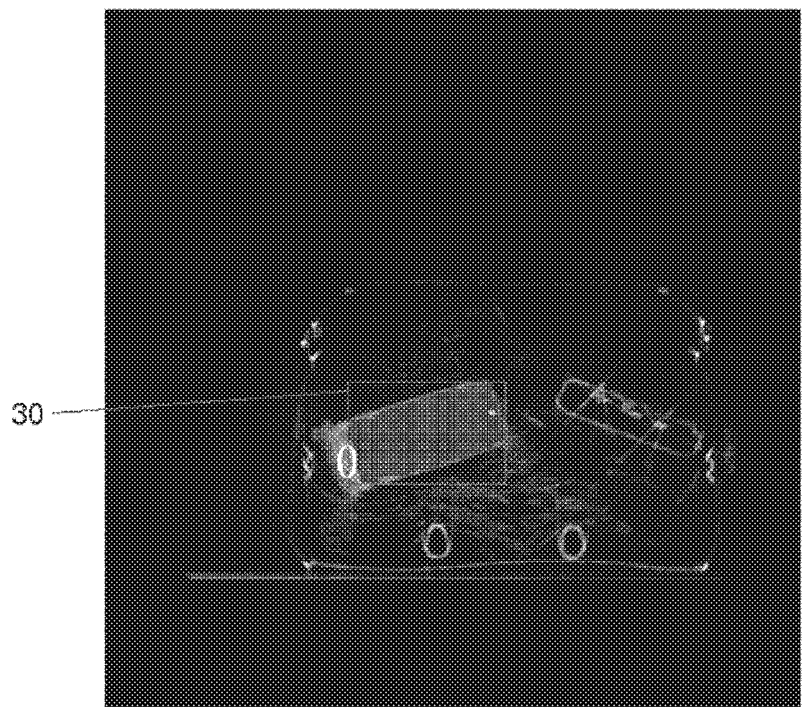
FIG. 9 is a schematic image of the recognition method shown in FIG. 6 where it has recognised out effective blocky regions within the tomogram.

5) The blocky regions detected out in the current tomogram are post-processed, so as to merge small and split blocky regions into a large blocky region (i.e., merging process). Such merging step is performed based on positional proximity and similarity of physical properties (for example, density and atomic number). It can be seen from FIG. 9 that the recognized region is donated by a reference number 30. It can be known from the above description that the step 5) is optional. The step 5) can be neglected when only one blocky region is present in the tomogram or it is thought that the merging process is not necessary.

6) A step of determining whether the blocky region recognized in the current tomogram can be merged with the blocky region detected from the previous tomogram, is performed so as to form a blocky target. It should be noted that if the current tomogram is a first tomogram of the object to be inspected, then it is not necessary for such merging step, and the blocky region is directly considered as a blocky target. After the first tomogram of the object to be inspected is processed, it should be determined whether the blocky regions inspected in the current tomogram can be merged with the previous blocky target (i.e., the blocky target analyzed out in the latest tomogram before the current tomogram, for example, the blocky target recognized out in the first tomogram). This can be determined on basis of the positional proximity, similarity of the physical property (for example, density and atomic number). If not, then a new blocky target is established.

Figure 10:
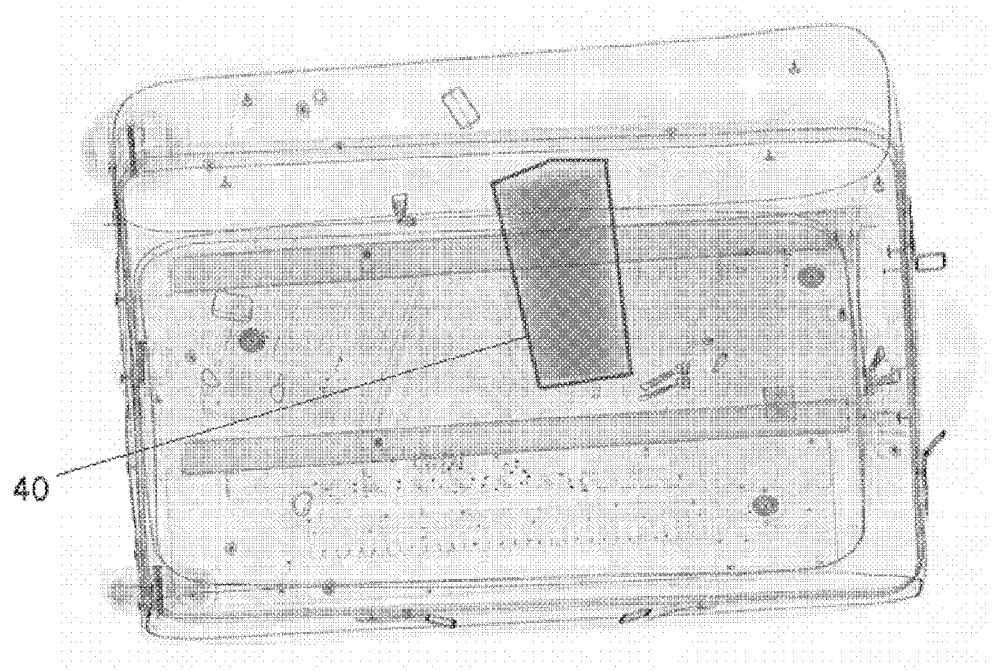
FIG. 10 is a schematic image of outputted blocky targets in accordance with the recognition method of FIG. 6.

7) A step of determining whether each detected blocky target is complete or finished, is performed. If the detected blocky target is finished, then the blocky target having a mass within a predetermined or reasonable range (i.e., a mass range of a prohibited article) is outputted. As shown in FIG. 10, the outputted blocky target is donated by a reference number 40.

8) Steps (1)-(7) are repeated and each tomogram data are processed layer by layer, until all of the tomogram data have been processed.

Here, it can be seen that the blocky target 40 can be recognized out by the recognizing method in accordance with the second embodiment of the present invention.

It should be understood that the present recognizing method of the present embodiment is not only applicable to the prohibited articles, but also to the materials such as explosives or drugs, as long as they have the flaky or blocky shape characteristics. In this case, it should be noted that the database of the prohibited articles should be replaced by the database of explosives or drugs, in this way, the above described method will become a recognizing method for explosives or drugs.

The present method is described by taking a CT system for item machine as one example. In practice, this method is applicable to various systems generating three-dimensional data, especially, a system generating tomogram data, including CT systems and nuclear magnetic resonance systems. Other systems generating three-dimensional data can also perform recognition and inspection of the flaky and blocky articles, as long as they can process the data one layer by one layer (tomogram by tomogram) in accordance with the present recognizing method.

Although some embodiments of the general inventive concept are illustrated and explained, it would be appreciated by those skilled in the art that modifications and variations may be made in these embodiments without departing from the principles and spirit of the general inventive concept of the disclosure, the scope of which is defined in the appended claims and their equivalents.

What is claimed is:

1. A method for recognizing blocky prohibited articles, explosives or drugs, characterized in that, comprising steps of:
   (1) reading in tomogram data for one tomogram of an object to be inspected;
   (2) pre-processing the current tomogram data;
   (3) splitting the pre-processed tomogram data into a plurality of regions that have similar physical properties;
   (4) as for each split region, physical property thereof is searched in a database of prohibited articles, explosives or drugs, wherein if the physical property searched is prohibitive, then the split region is recognized as an effective blocky region;
   (5) determining whether the blocky region recognized in the current tomogram can be merged with the blocky region detected from the previous tomogram, so as to form a blocky target;
   (6) determining whether each detected blocky target is finished or complete;
   (7) repeating steps (1)-(46) and processing each tomogram data layer by layer, until all of the tomogram data have been processed.

2. The method of claim 1, characterized in that,
after the step (4), the method further comprises post-processing the blocky regions detected out in the current tomogram, so as to merge small and split blocky regions into a large blocky region.

3. The method of claim 2, characterized in that,
the merging step in the step (5) and the process to merge the small blocky regions are performed based on positional proximity and similarity of physical properties.

4. The method of claim 3, characterized in that,
the physical properties comprise density or atomic numbers.

5. The method of claim 1, characterized in that,
the expression of "the physical property searched being prohibitive" is meant that the physical property of the split region matches to data within a database of the prohibited articles, explosives or drugs.

6. The method of claim 1, characterized in that,
in the step (5), if it is determined that the blocky regions detected in the current tomogram can be merged with the previous blocky targets, then the step (6) is performed; otherwise, a new blocky target is established.

7. The method of claim 1, characterized in that,
during the step (6), if it is determined that the detection to each detected blocky target is finished or complete, then the blocky target with a mass within a predetermined ranged is outputted.

8. The method of claim 1, characterized in that,
the pre-processing step comprises: threshold limit, smoothing and quantifying of the tomogram data.

9. The method of claim 1, characterized in that,
this method is applicable to a CT system or a nuclear magnetic resonance system.

* * * * *